(12) United States Patent
Chiu (10) Patent No.: US 7,679,811 B2
(45) Date of Patent: Mar. 16, 2010

(54) IMAGE SYSTEM AND MINIATURE DEFORMABLE MIRROR THEREOF

(76) Inventor: Chen-Wei Chiu, 5F-1, No. 227, Sec. 3, Roosevelt Rd., Taipei 106 (TW)

( * ) Notice: Subject to any disclaimer, the term of this patent is extended or adjusted under 35 U.S.C. 154(b) by 423 days.

(21) Appl. No.: 11/423,617

(22) Filed: Jun. 12, 2006

(65) Prior Publication Data

US 2007/0008634 A1    Jan. 11, 2007

Related U.S. Application Data

(60) Provisional application No. 60/689,565, filed on Jun. 13, 2005.

(51) Int. Cl.
*G02B 26/00* (2006.01)
(52) U.S. Cl. .................. 359/291; 359/290
(58) Field of Classification Search ............ 359/290, 359/291, 292, 298, 242, 267, 699, 811
See application file for complete search history.

(56) References Cited

U.S. PATENT DOCUMENTS

| | | | | |
|---|---|---|---|---|
| 5,022,745 | A * | 6/1991 | Zayhowski et al. | ......... 359/847 |
| 6,369,954 | B1 | 4/2002 | Berge et al. | |
| 6,462,858 | B1 | 10/2002 | MacDonald et al. | |
| 6,483,641 | B1 | 11/2002 | MacAulay | |
| 6,607,277 | B2 * | 8/2003 | Yokoyama et al. | ............ 353/52 |
| 6,870,688 | B2 | 3/2005 | Obama | |
| 6,970,284 | B1 | 11/2005 | Kim et al. | |
| 6,977,777 | B1 | 12/2005 | Wick | |
| 7,071,456 | B2 * | 7/2006 | Poplin | .................. 250/214 AL |
| 7,098,517 | B2 * | 8/2006 | Matsuo | ....................... 257/415 |
| 7,166,486 | B2 | 1/2007 | Ohtaka et al. | |
| 7,251,066 | B2 | 7/2007 | Chao et al. | |
| 7,387,394 | B2 | 6/2008 | Minegishi | |
| 2003/0170024 | A1 | 9/2003 | Nishioka et al. | |
| 2007/0109667 | A1 | 5/2007 | Chiu | |

OTHER PUBLICATIONS

Guo-Dung J. Su, Yu-Wei Yeh, Chen-Wei E. Chiu, Chao-Hu Li, and Tyng-Yow Chen; Fabrication and Measurement of Low-Stress Polyimide Membrane for High-Resolution Variable Optical Attenuator; IEEE Journal of Selected Topics in Quantum Electronics, vol. 13, No. 2, Mar./Apr. 2007.

* cited by examiner

*Primary Examiner*—Darryl J Collins
*Assistant Examiner*—Brandi N Thomas
(74) *Attorney, Agent, or Firm*—Alan Kamrath; Kamrath & Associates PA (57) ABSTRACT

A miniature deformable mirror includes an upper portion, a lower portion, and a spacer. The upper portion includes a frame, an organic thin film, and a reflecting layer. The organic thin film is used as a deformed element and is supported by the frame. The reflecting layer is disposed on the organic thin film used for reflecting incident light. The lower portion includes a conductive substrate. The conductive layer is disposed on the substrate and is used for conducting the driving voltage. The spacer is sandwiched between the upper portion and the lower portion. While voltages are applied, electrostatic forces are generated to deform the organic thin film and reflecting layer. Therefore, a miniature deformable mirror with continuously variable focuses is realized.

8 Claims, 12 Drawing Sheets

IMAGE SYSTEM AND MINIATURE DEFORMABLE MIRROR THEREOF

CROSS-REFERENCE TO RELATED APPLICATIONS

This application is a non-provisional application claiming benefit of U.S. provisional Patent Application Ser. No. 60/689,565 filed on Jun. 13, 2005, the entire disclosure of which is incorporated by reference herein.

FIELD OF THE INVENTION

The present invention relates to a miniature mirror. More particularly, the present invention relates to a miniature deformable mirror.

DESCRIPTION OF RELATED ART

The miniature mirror fabricated by Micro-Electro-Mechanical System (MEMS) technology has been widely employed in various optical devices and the applications thereof, such as projectors, projection TVs, and optical switches, etc. However, not many miniature mirrors have been employed in an image capturing system, such as a camera, to provide functions such as focusing, zooming in, and zooming out. In order to achieve these functions, traditional devices use motors to move lenses, and they generally occupy large space of the image capturing system.

MEMS devices are compact and precise and, therefore, are suitable to replace the motors and lenses for such applications. There have been many MEMS deformable mirrors made to change the focuses of incident light. Due to the mechanical properties of most semiconductor materials, however, the sizes of mirrors are always very small, and the variations of focal lengths are limited as well. Consequently, these traditional MEMS mirrors cannot be used for image applications, which require a large number of apertures and sufficient focal length for variations.

Figure 1A:
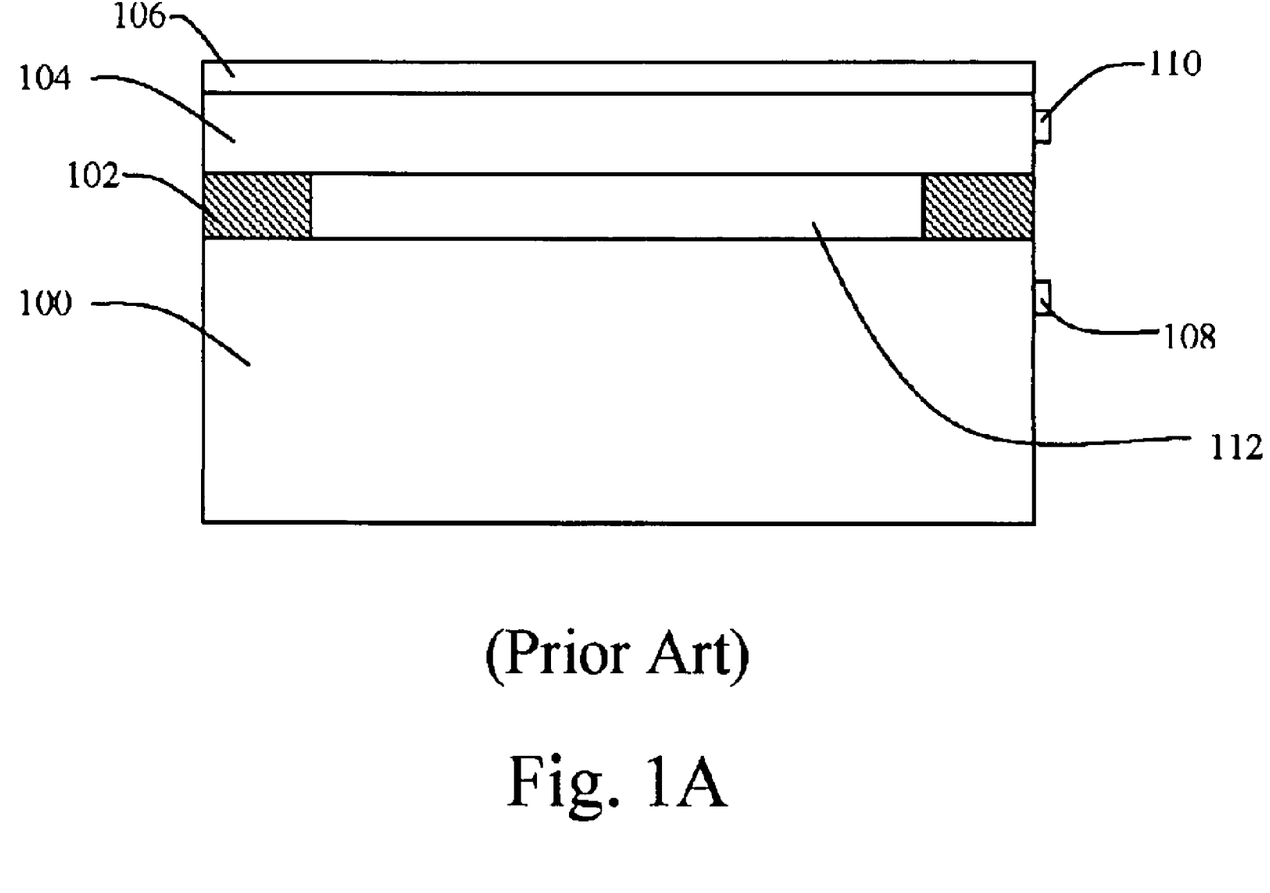
FIG. 1A and FIG. 1B are cross-sectional diagrams illustrating the typical miniature mirror in the prior art.

U.S. Pat. No. 5,022,745 discloses an electrostatically deformable single crystal mirror comprising a highly conducting thick substrate layer and a highly conducting thin membrane layer separated from the thick layer by an insulator. Please refer to FIG. 1A, which shows a cross-sectional diagram of a traditional deformable mirror device. It illustrates a typical miniature deformable mirror fabricated by MEMS technology. A thick, highly doped, conducting silicon wafer serves as a substrate 100. An oxide layer 102 is deposited on the substrate 100 and, then, is etched to form a cavity 112. A thin silicon wafer 104 has at least one surface polished optically flat thereon, and the flat surface is dielectrically coated to form a mirror surface 106. The thin silicon wafer 104 is then bonded to the substrate 100 with the mirror surface 106 facing away from the substrate 100 oppositely. Accordingly, The minor surface 106 is separated from the substrate 100 by The thickness of the oxide layer 102.

Figure 1B:
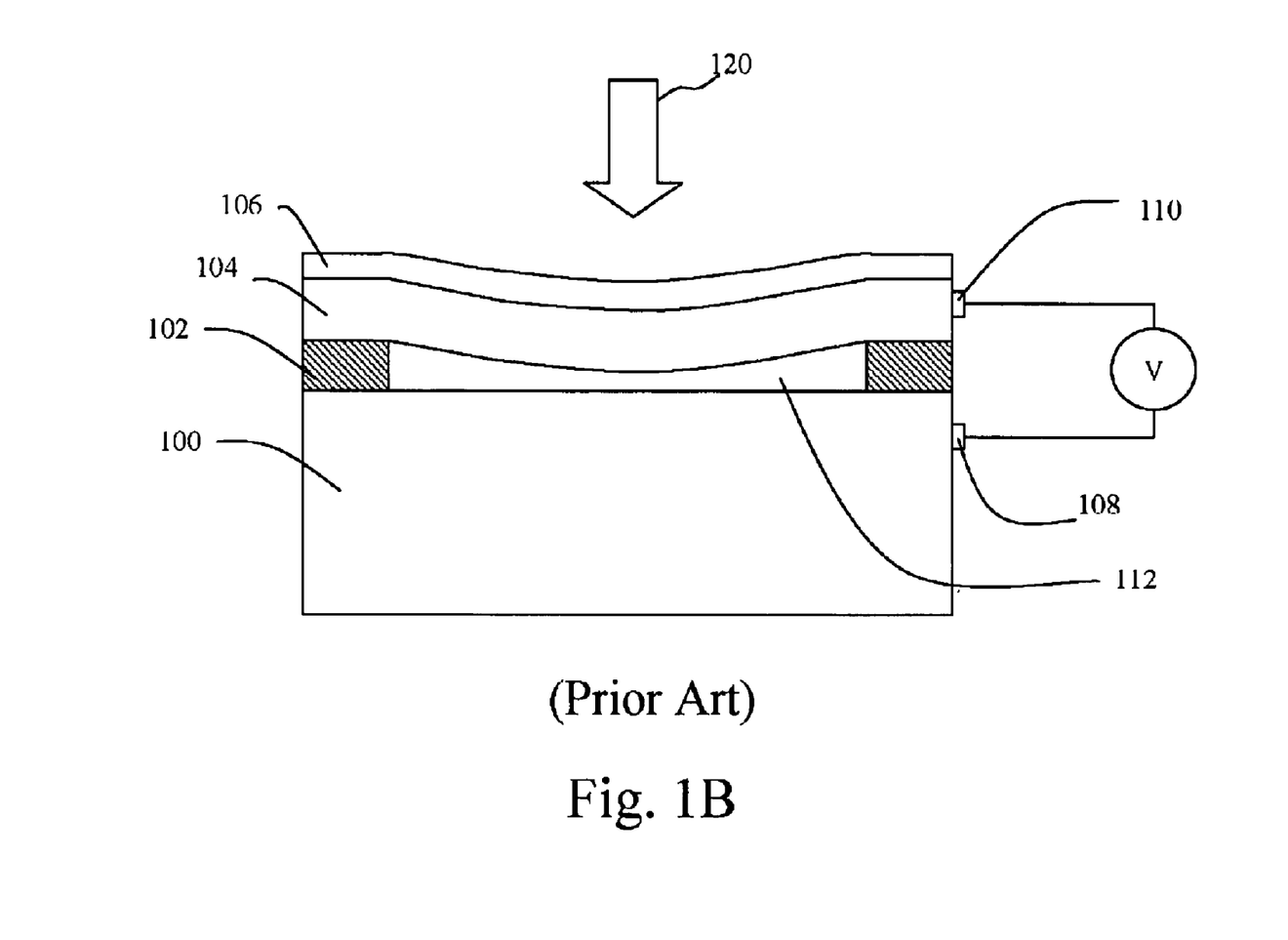

As shown in FIG. 1B, two electrical contacts 108 and 110 are used to establish a potential difference between the substrate 100 and the thin silicon wafer 104. When a potential is applied between the electrical contacts 108 and 110, the thin silicon wafer 104 is attracted toward the substrate 100 by electrostatic forces. Therefore, the mirror surface 106 deforms and reflects incident light with variable focuses.

However, one drawback of the typical miniature mirror is that the deformation of the mirror surface 106 is very limited, and not sufficient to be used for image applications. One main reason is the high Young's Modulus of single crystal silicon. In order to attract the thin silicon wafer 104 downward, the electrostatic forces (i.e. caused by the voltage V shown in FIG. 1B) have to be relatively large. This implies a separation between the substrate 100 and thin silicon wafer 104 is limited. In addition, using oxide as a spacer to form the cavity 112 can hardly have the sufficient thickness for deformation due to the semiconductor fabrication technology being used. Therefore, the moving distance of the mirror surface 106 is constrained within a few micrometers at most.

Besides, another obstacle of the conventional miniature mirror is that the material of the single crystal silicon is not transparent. Consequently, the mirror surface 106 has to be on the top surface of the thin silicon wafer 104 in order to reflect the incident light. This limits the flexibility of fabrication processes for the conventional miniature mirror. Moreover, the incident light can only hit the mirror surface 106 from an upper direction (i.e. the downward direction of arrow 120 shown in FIG. 1B). That is, when both concave and convex mirrors are required as in most image applications, the conventional miniature mirror is not applicable since the incident light can only illuminate the mirror surface 106 in one direction.

For the foregoing reasons, there is a need for an improved miniature deformable mirror that can have a better deformation range and can be used with both concave and convex mirror functions.

SUMMARY OF THE INVENTION

It is therefore an objective of the present invention to provide a miniature deformable mirror with improved deformation capabilities and having both concave and convex functions, such as for focusing, zooming-in, and zooming out.

It is another objective of the present invention to provide a method for fabricating a miniature deformable mirror.

It is still another objective of the present invention to provide an auto-focusing system with a miniature deformable mirror.

It is still further another objective of the present invention to provide a zooming system with miniature deformable mirrors.

In accordance with the foregoing and other objectives of the present invention, a miniature deformable mirror is provided. The miniature deformable mirror comprises an upper portion, a lower portion, and a spacer. The upper portion comprises a frame, an organic thin film, and a reflecting layer. The organic thin film is deformable and supported by the frame. The reflecting layer is used for reflecting incident light and is disposed on or under the organic thin film. The lower portion includes a conductive substrate. Alternatively, the conductive substrate may comprise a substrate and a conductive layer. The conductive substrate is used for conducting the driving voltage. The spacer is sandwiched between the upper portion and the lower portion.

In accordance with another objective of the present invention, a method for making a miniature deformable mirror is provided. First, it deposits masking films on both sides of a frame and then partially removes the masking films. Next, it etches the exposed frame without etching through with a remaining membrane remaining. Then, it deposits and patterns a reflecting layer on the masking film. Thereafter, it forms an organic thin film on the reflecting layer. Subsequently, it forms an insulation layer on a substrate. Next, it deposits and patterns a conductive layer on the insulation layer. Then, it forms a spacer with an opening on the conductive layer. Afterward, it bonds the organic thin film to the spacer. Finally, it etches through the remaining membrane of the frame and the masking film.

In accordance with still another objective of the present invention, an image system with a miniature deformable mirror is provided. The image system comprises a camera module, a miniature deformable mirror, and a power supply control unit. The camera module comprises a lens set, a control circuitry, an image-sensing element, and a miniature deformable mirror. The lens set is used for forming an image of an object. The image-sensing element is used to obtain the image of the object formed by the lens set. The miniature deformable mirror is on the light path between the object and the lens set for adjusting the projected image of the object in front of the lens set so that the image of the object is properly formed on the image-sensing element. The control circuitry is used for controlling the deformation of the miniature deformable mirror by the power from a power supply control unit.

In accordance with still another objective of the present invention, a zooming system with two miniature deformable mirrors is proposed. The zooming system includes a lens set, a control circuitry, an image-sensing element, and two miniature deformable mirrors. The lens set is used for forming an image of the object. The image-sensing element senses the image of the object formed by the lens set. The two miniature deformable mirrors are on the light path between the object and the lens set for enlarging or reducing the projected image size into the lens set, so that the image of the object is zoomed-in or zoomed-out on the image-sensing element. The control circuitry is used for controlling the deformation of the miniature deformable mirror by the power from a power supply control unit.

The present invention provides a miniature deformable mirror with improved deformation range. The present invention also provides a miniature deformable mirror that can be employed as a concave mirror or a convex mirror.

These and other features, aspects, and advantages of the present invention will become better understood with reference to the following description and appended claims. It is to be understood that both the foregoing general description and the following detailed description are by way of examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2A:
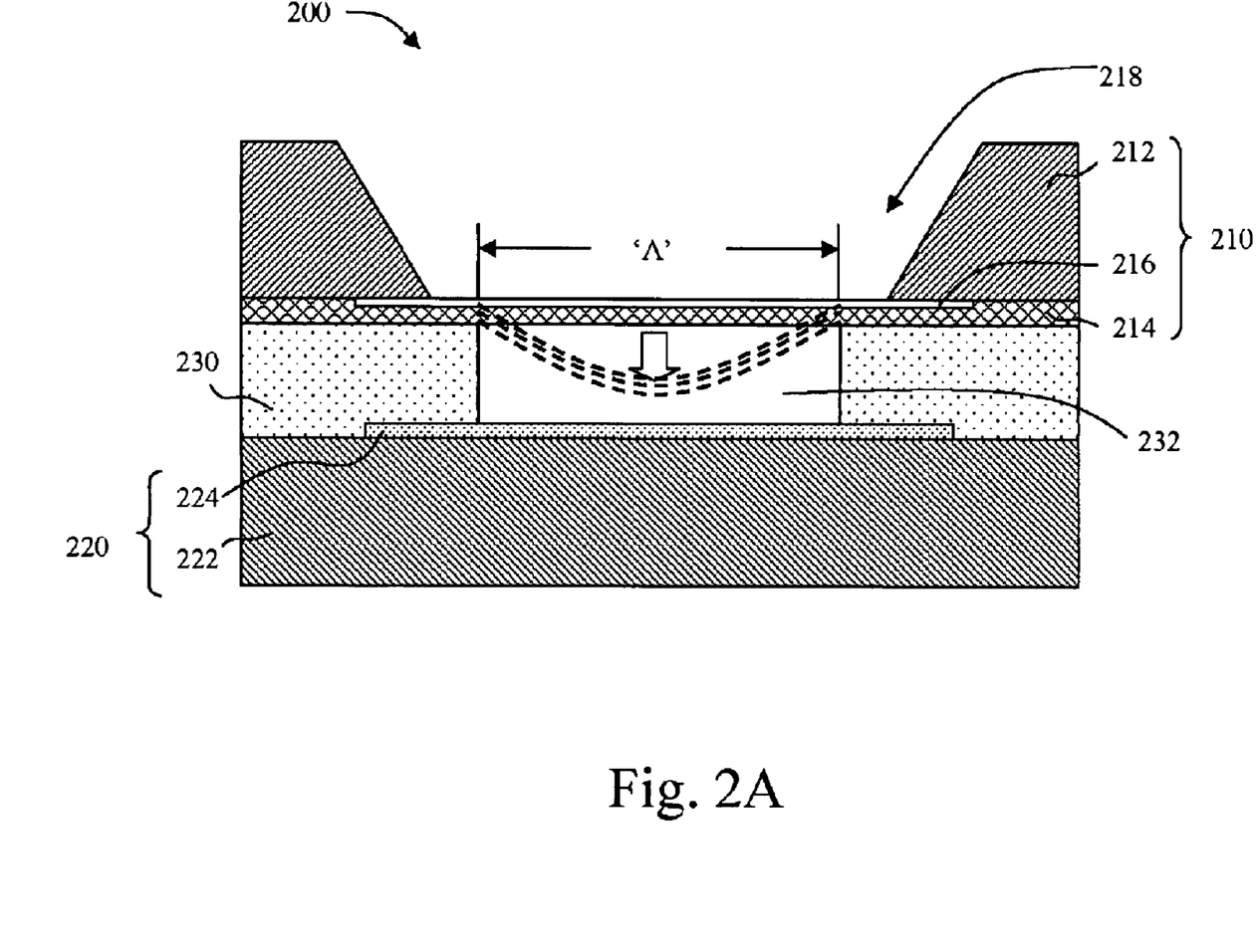
FIG. 2A is a cross-sectional diagram of the miniature deformable mirror according to one preferred embodiment of the present invention.

FIG. 2A is a cross-sectional diagram illustrating a miniature deformable mirror 200 according one preferred embodiment of the present invention. The miniature deformable mirror 200 includes an upper portion 210, a lower portion 220, and a spacer 230. The miniature deformable mirror 200 is fabricated by bonding the upper portion 210 and the lower portion 220 with the spacer 230 in between.

The upper portion 210 comprises a frame 212, an organic thin film 214, and a reflecting layer 216. The frame 212 having a mirror opening 218 supports the organic thin film 214. The frame 212, for example, can be made by silicon substrate. The reflecting layer 216 is disposed on the upper surface of the organic thin film 214. Alternatively, the reflecting layer 216 can also be disposed on the lower surface of the organic thin film 214. Further, the reflecting layer 216 can also be disposed on both of the upper and the lower surfaces of the organic thin film 214.

The organic thin film 214 is deformable and is made of compliant organic material. For example, the organic thin film 214 can be made by CYTOP™, a fluoropolymer manufactured by Asahi Glass Co., Ltd., Japan. In addition to CYTOP™, the organic thin film 214 can be made of other fluoropolymers, polyimides, elastomers, or other compliant organic materials. By employing the compliant organic material for the organic thin film 214, increased mirror size and improved deformation range can be obtained, as compared with the single crystal silicon utilized in the conventional mirror.

The reflecting layer 216 is used for reflecting incident light and can be made of materials, such as aluminum, silver, chromium, titanium or the alloy thereof, for reflecting light. The organic thin film 214 and the reflecting layer 216 are not limited to a single layer. Multiple organic thin films 214 and multiple reflecting layers 216 can be arranged in an alternating configuration.

The lower portion 220 comprises a substrate 222 and a conductive layer 224 disposed on the substrate 222. Alternatively, the substrate 222 may be a conductive substrate without a conductive layer 224 thereon. The substrate 222 can be made of materials typically employed in the semiconductor fabrication, such as silicon, glass, plastic, or gallium arsenide. The conductive layer 224 (or the conductive substrate 222) is used for conducting the applied voltage and can be made of conductive materials, such as aluminum, gold, or indium tin oxide.

The spacer 230 with a desired shape of a spacer opening 232 is sandwiched between the upper portion 210 and the lower portion 220. The actual mirror deflecting area 'A' is defined by the spacer opening 232 instead of the mirror opening 218. Therefore, the size and shape of the mirror deflecting area 'A' can be adjusted as desired regardless of the shape of the mirror opening 218 initially formed by anisotropic etching. As a result, a more flexible mirror deflecting area 'A' can be obtained, which is not restricted to the etching profile of the mirror opening 218. The spacer 230 is used for separation purposes as well and can be made of, for example, photoresist, polyimide, polyethylene, or an elastomer, such as polydimethylsiloxane (PDMS). Different from the oxide spacer used in the conventional mirror, the thickness of the spacer 230 can easily achieve tens of micrometers to hundreds of micrometers with the abovementioned materials and the like.

In order to deform the organic thin film 214 and the reflecting layer 216, voltages are applied between the reflecting layer 216 and the conductive layer 224 (or the conductive substrate 222). The reflecting layer 216 and the conductive layer 224 (or the conductive substrate 222) serve as a first electrode and a second electrode, respectively, and they can be patterned into different shapes, sizes and numbers of electrodes. The applied voltages generate electrostatic forces to attract the organic thin film 214 and the reflecting layer 216 toward the lower portion 220. Only within the mirror deflecting area 'A', the organic thin film 214 and the reflecting layer 216 are moveable toward the lower portion 220. By varying electrode designs and applied voltages, a desired deformation profile or shape of the organic thin film 214 and the reflecting layer 216 can be obtained.

Figure 2B:
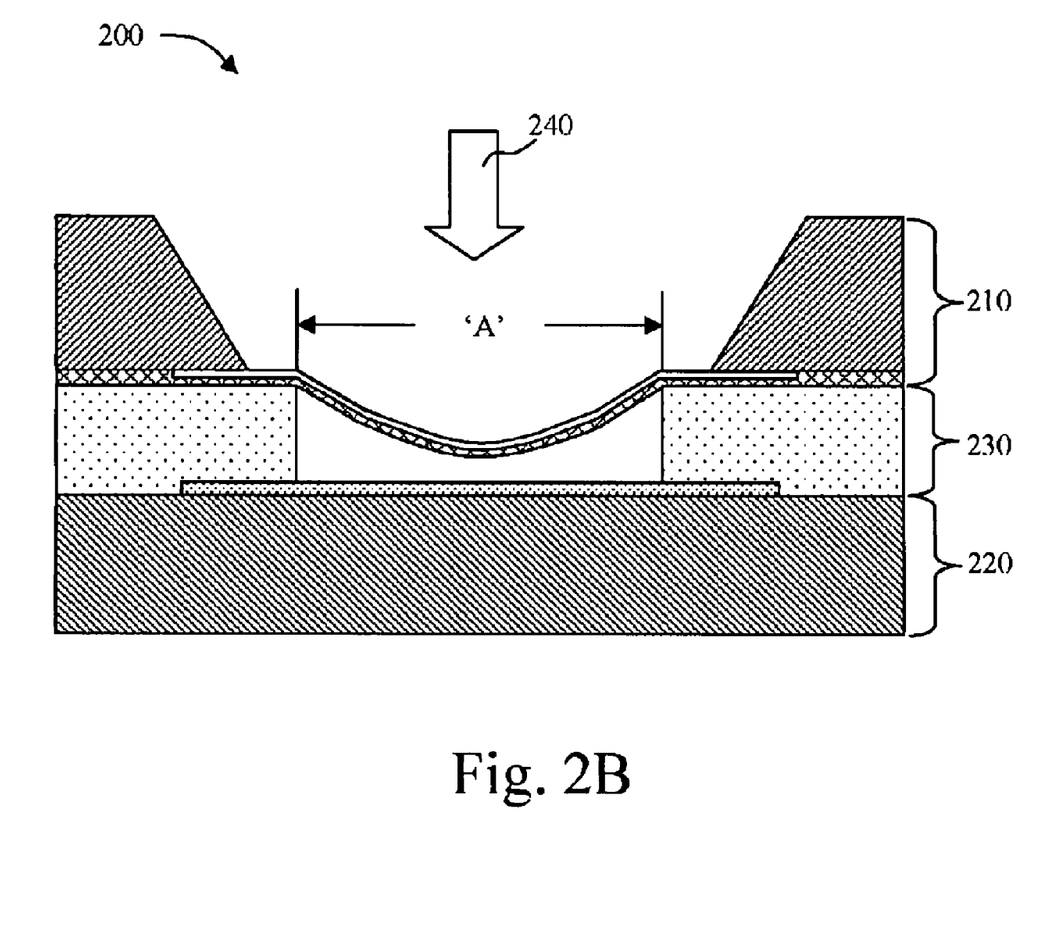
FIG. 2B and FIG. 2C are cross-sectional diagrams illustrating the application of the miniature deformable mirror as a concave or a convex mirror to reflect the incident light according to one preferred embodiment of the present invention.
Figure 2C:
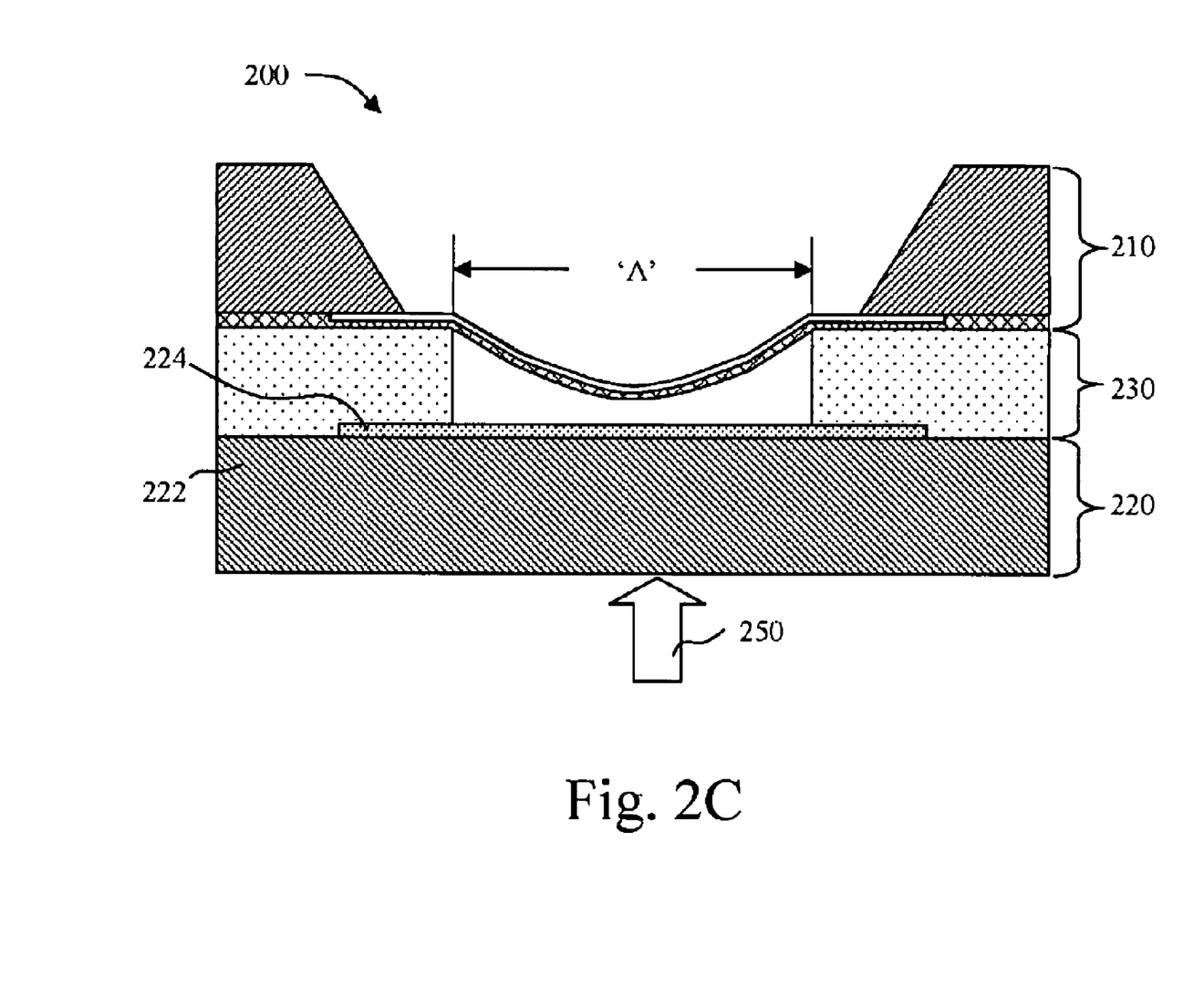

FIGS. 2B and 2C illustrate how the miniature deformable mirror 200 is employed as a concave mirror and a convex mirror to reflect light or images, respectively. In FIG. 2B, light or images 240 are directed onto the reflecting mirror area 'A' from the upper portion 210, and the miniature deformable mirror 200 serves as a concave deformable mirror.

On the contrary, as shown in FIG. 2C, while the substrate 222, the conductive layer 224, and the organic thin film 214 are made of transparent materials, the miniature deformable mirror 200 can be utilized as a convex mirror. For example, the substrate 222 can be made by transparent glass, while the conductive layer 224 and the organic thin film 214 can be made by transparent indium tin oxide and CYTOP™ respectively. Consequently, the light or images 250 are able to pass through the lower portion 220, and then reach the reflecting mirror area 'A'. As a result, the miniature deformable mirror 200 can serve as a convex deformable mirror.

Figure 3A:
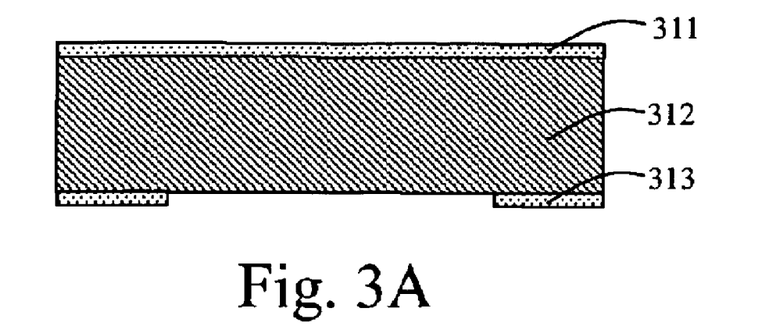
FIG. 3A to FIG. 3G are cross-sectional diagrams illustrating the process flow for fabricating the miniature deformable mirror according to another preferred embodiment of the present invention.
Figure 3B:
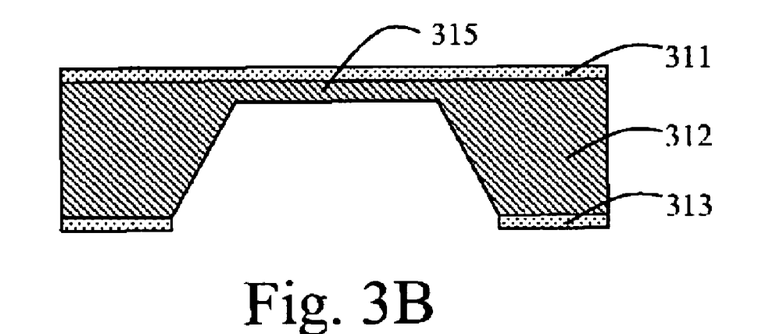
Figure 3C:
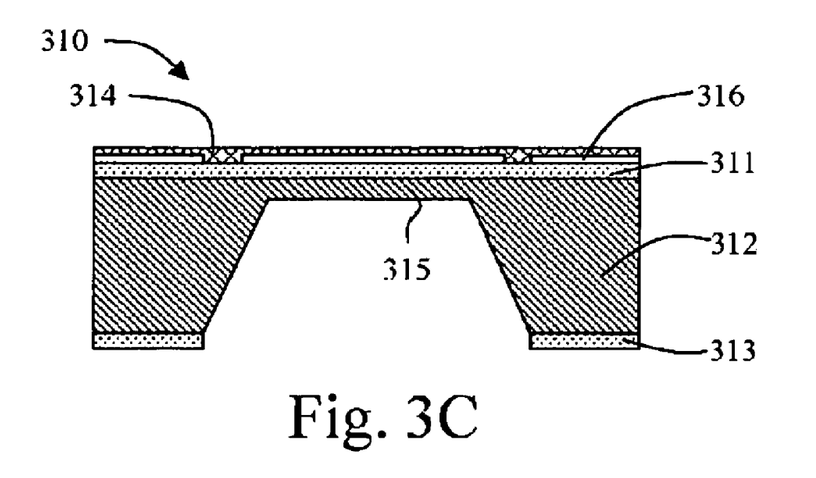
Figure 3D:
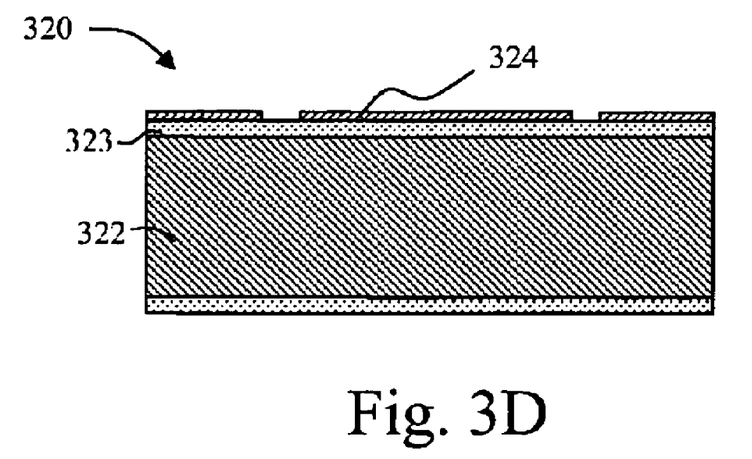
Figure 3E:
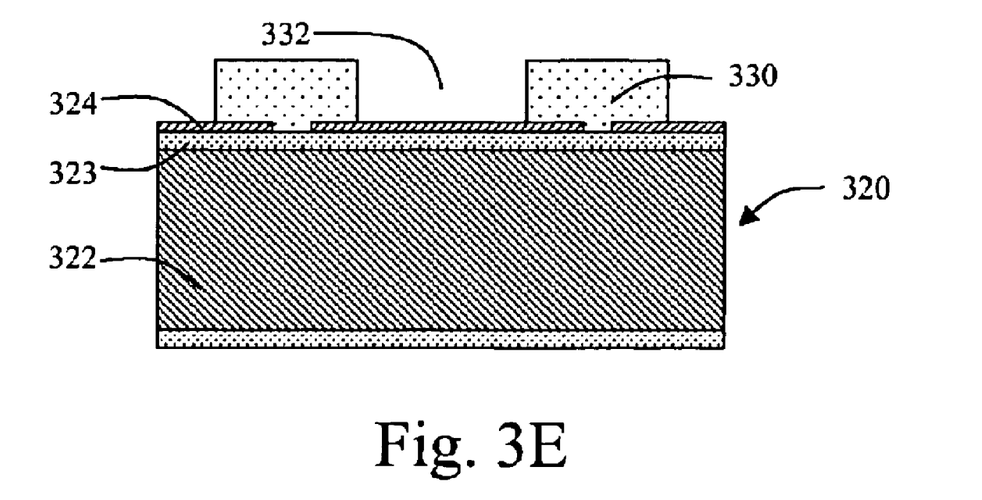
Figure 3F:
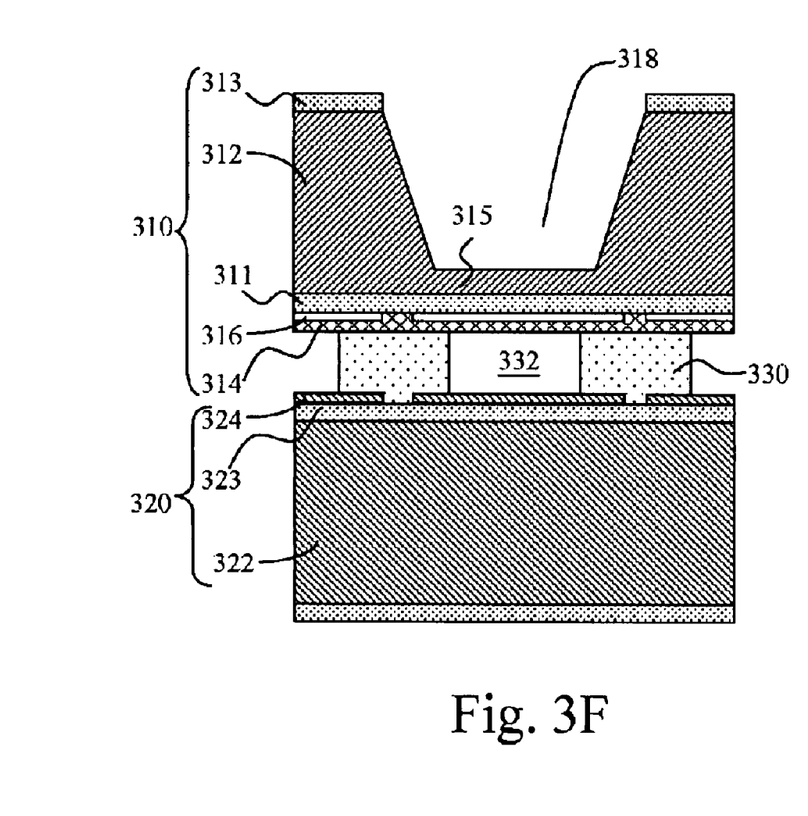
Figure 3G:
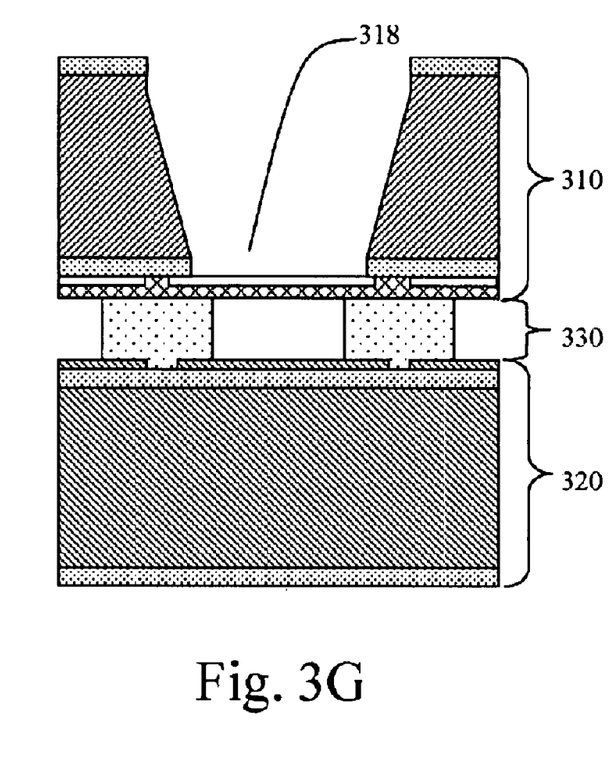
Figure 3H:
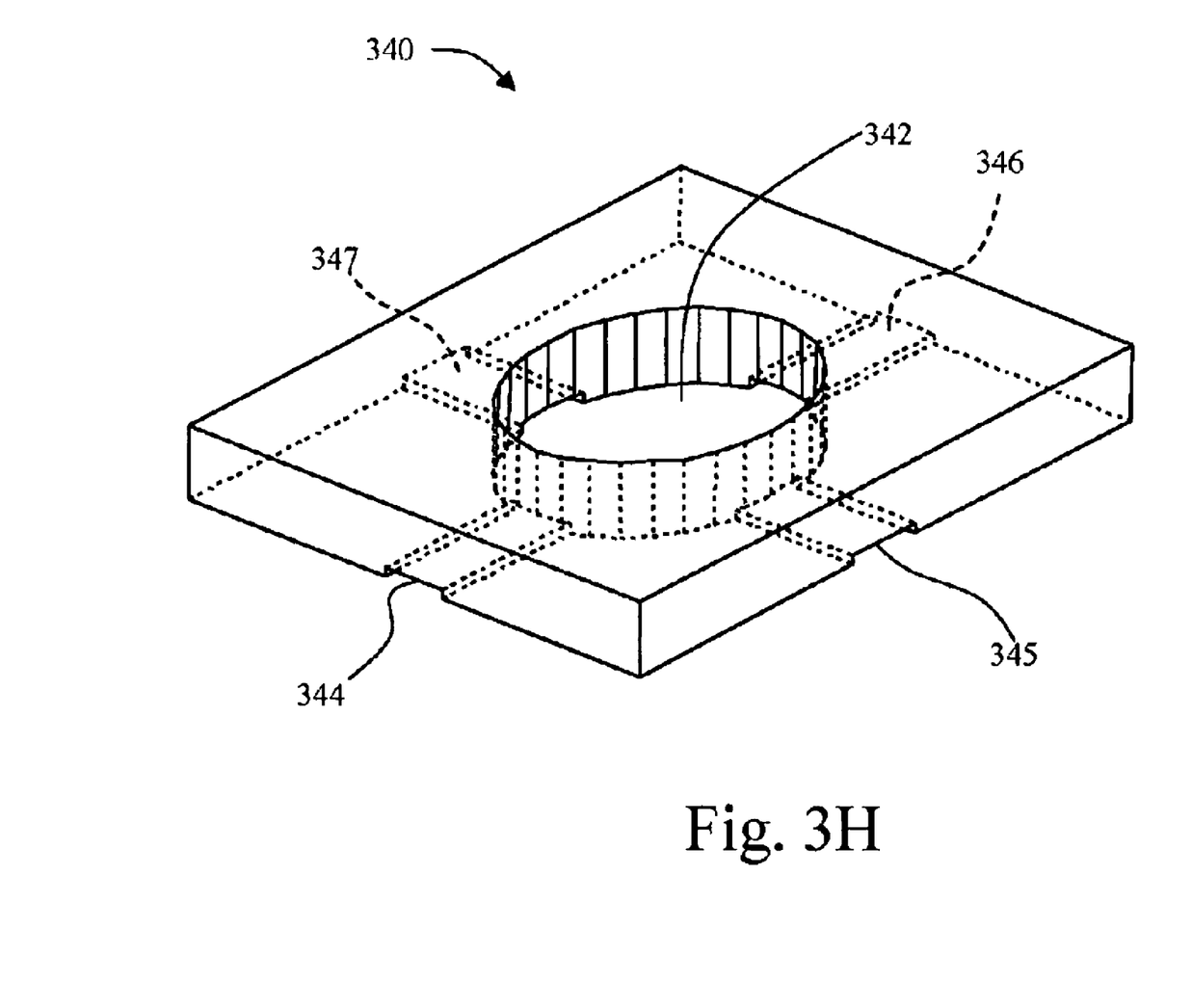
FIG. 3H is a perspective drawing illustrating an air-passing spacer that can be employed in the miniature deformable mirror according to another preferred embodiment of the present invention.
Figure 3I:
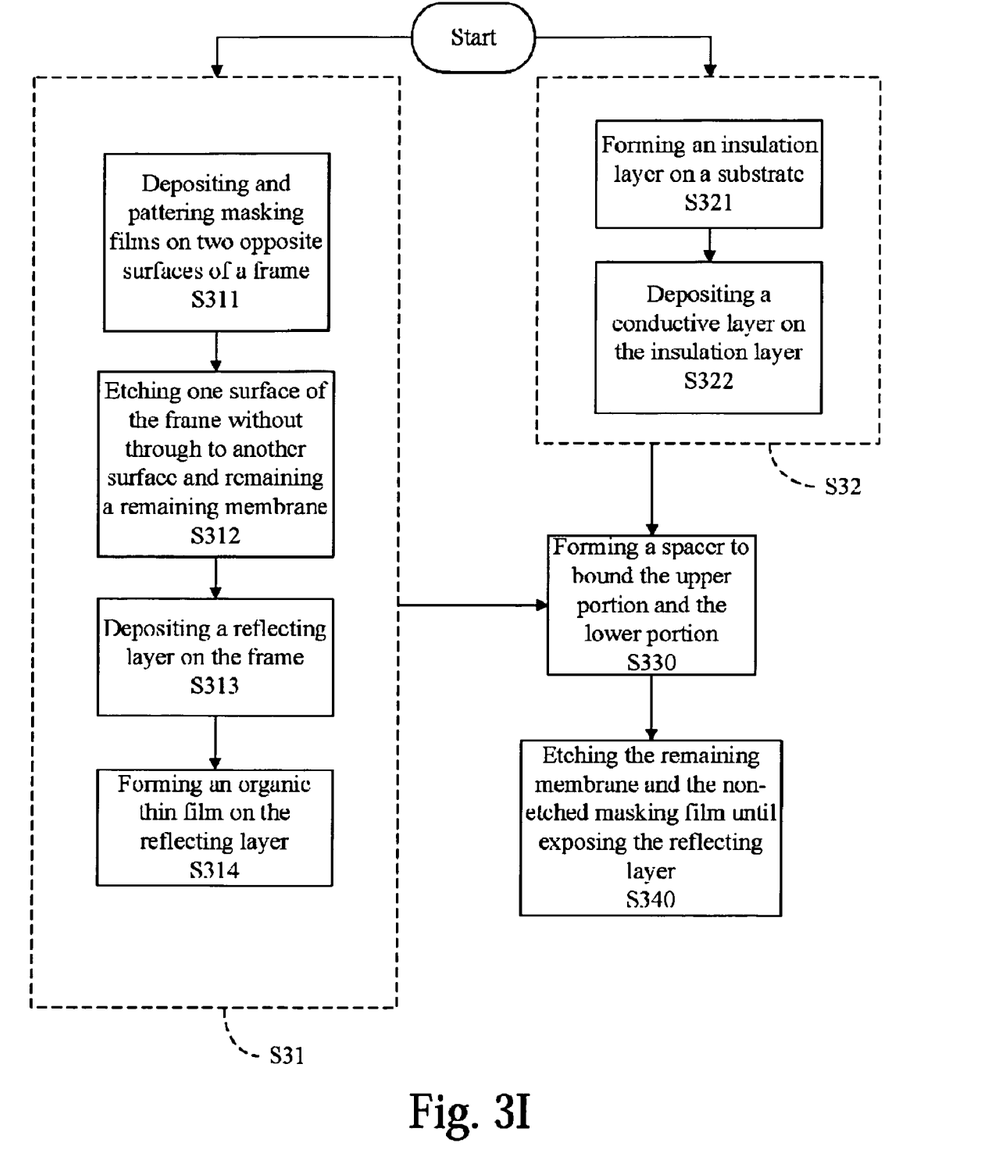
FIG. 3I is a flow chart of a method for making a miniature deformable mirror in accordance with the present invention.

Now referring to FIG. 3A to FIG. 3G and FIG. 3I. FIG. 3A to FIG. 3G are cross-sectional drawings illustrating the processes for fabricating the miniature deformable mirror 200 according to one preferred embodiment of the present invention. FIG. 3I is a flow chart of a method for making a miniature deformable mirror 200 in accordance with the present invention.

Referring to FIG. 3I, after "start", the process comes to step S31 of forming an upper portion 310 and step S32 of forming a lower portion 320. As will be understood by those of skill in the art, steps S31 and S32 can either be in sequence or not. In another word, one can process step S31 or step S32. Then, it comes to step S330 of forming a spacer to bond the upper portion and the lower portion.

Please see FIG. 3A to FIG. 3B for a more detailed description of the step S31 in FIG. 3I. FIG. 3A to FIG. 3C are the drawings illustrating fabricating processes for an upper portion 310. First, as shown in FIG. 3A, masking films 311 and 313 are deposited on both surfaces of a frame 312 in which the masking film 313 is patterned and etched (as also shown and described in step S311 of FIG. 3I). The frame 312, for example, can be a silicon frame. The masking films 311 and 313, for example, can be silicon dioxide ($SiO_2$), silicon nitride (SiN), or other alternatives, and can be formed by one or more semiconductor deposition techniques, such as oxidation, Low Pressure Chemical Vapor Deposition (LPCVD), or Plasma Enhanced Chemical Vapor Deposition (PECVD).

Then, in FIG. 3B, the exposed frame 312 is anisotropically wet etched or dry etched, without etching through the frame 312 (as also shown and described in step S312 of FIG. 3I). A remaining membrane 315 of the frame 312 remains to support the following process steps and will be released away at the final step. A reflecting layer 316 is then deposited on the masking film 311 (as also shown and described in step S313 of FIG. 3I) and patterned with a desired shape, as shown in the FIG. 3C. An organic thin film 314 is then formed on the reflecting layer 316 (as also shown and described in step S314 of FIG. 3I). For example, the organic thin film 314 can be formed by spin coating and then baked by a temperature (such as 180° C. when the CYTOP™ material for the organic thin film 314 is employed) to vaporize the solvents.

Please see FIG. 3D and FIG. 3E for a more detailed description of the steps 532 and S330 in FIG. 3I. FIG. 3D and FIG. 3E are drawings illustrating the processes for manufacturing a lower portion 320 and a spacer 330. As shown in the FIG. 3D, an insulation layer 323 is first formed on a substrate 322 (as also shown and described in step S321 of FIG. 3I). A conductive layer 324 is then deposited on the insulation layer 323 and patterned into desired electrode shapes (as also shown and described in step S322 of FIG. 3I). Alternatively, an insulated material can be used for the substrate 322, and the conductive layer 324 can be directly deposited on the substrate 322 without forming the insulation layer 323 in between.

Next, as shown in FIG. 3E and in step S330 of FIG. 3I, the spacer 330 is formed on the conductive layer 324. The spacer 330, for example, can be made by photoresist material. The photoresist material is firstly spin coated on the conductive layer 324 and, then, patterned by photolithography to form the spacer 330 with a spacer opening 332 for supporting the organic thin film 314 and the reflecting layer 316 to deform. Alternatively, the spacer 330 can be formed on the organic thin film 314 instead of the conductive layer 324 because of the strong support of the remaining membrane 315.

FIGS. 3F and 3G are the cross-sectional drawings illustrating the bonding and releasing process of the upper portion 310 and the lower portion 320. The spacer 330, with or without adhesive, serves as an intermediate layer to bond the upper portion 310 and lower portion 320 together. While the spacer 330 is made of photoresist material, for example, with the upper portion 310 and the lower portion 320 aligned, the spacer 330 may be treated with a bonding process of increasing the pressure and the temperature, as shown in FIG. 3F. Alternatively, the spacer 330 may use adhesive without any special treatment to bond the upper portion 310 and the lower portion 320. After bonding the upper portion 310 and the lower portion 320 with the spacer 330 in between, the remaining membrane 315 and the masking film 311 are then etched away to form a mirror opening 318 and expose the reflecting layer 316 (as also shown and described in step S340 of FIG. 3I). Then, the organic thin film 314 and the reflecting layer 316 within the spacer opening 332 are free to move, as shown in the FIG. 3G.

Alternatively, the spacer 330 can be made by material PDMS instead of photoresist. material. The spacer 330 made by PDMS with the spacer opening 332 can be firstly bonded on either the upper portion 310 or the lower portion 320 by plasma treatment and heating. Followed by another plasma treatment and heating, the spacer 330 made by PDMS can bond the upper portion 310 and the lower portion 320 together.

Furthermore, the spacer 330 may further comprise at least one air channel to allow air passing through. The air channels are able to keep pressures at both sides of the organic thin film 314 equivalent. Therefore, while no voltage is applied, the organic thin film 314 can maintain its default profile in spite of different environmental pressures.

FIG. 3H illustrates an example of an air-passing spacer 340, which has a circular spacer opening 342 with four air channels 344, 345, 346, 347 radially extending therefrom. By molding with material PDMS, for example, it can easily make the air-passing spacer 340, which can bond the upper portion 310 and lower portion 320 together to form another embodiment.

Figure 4:
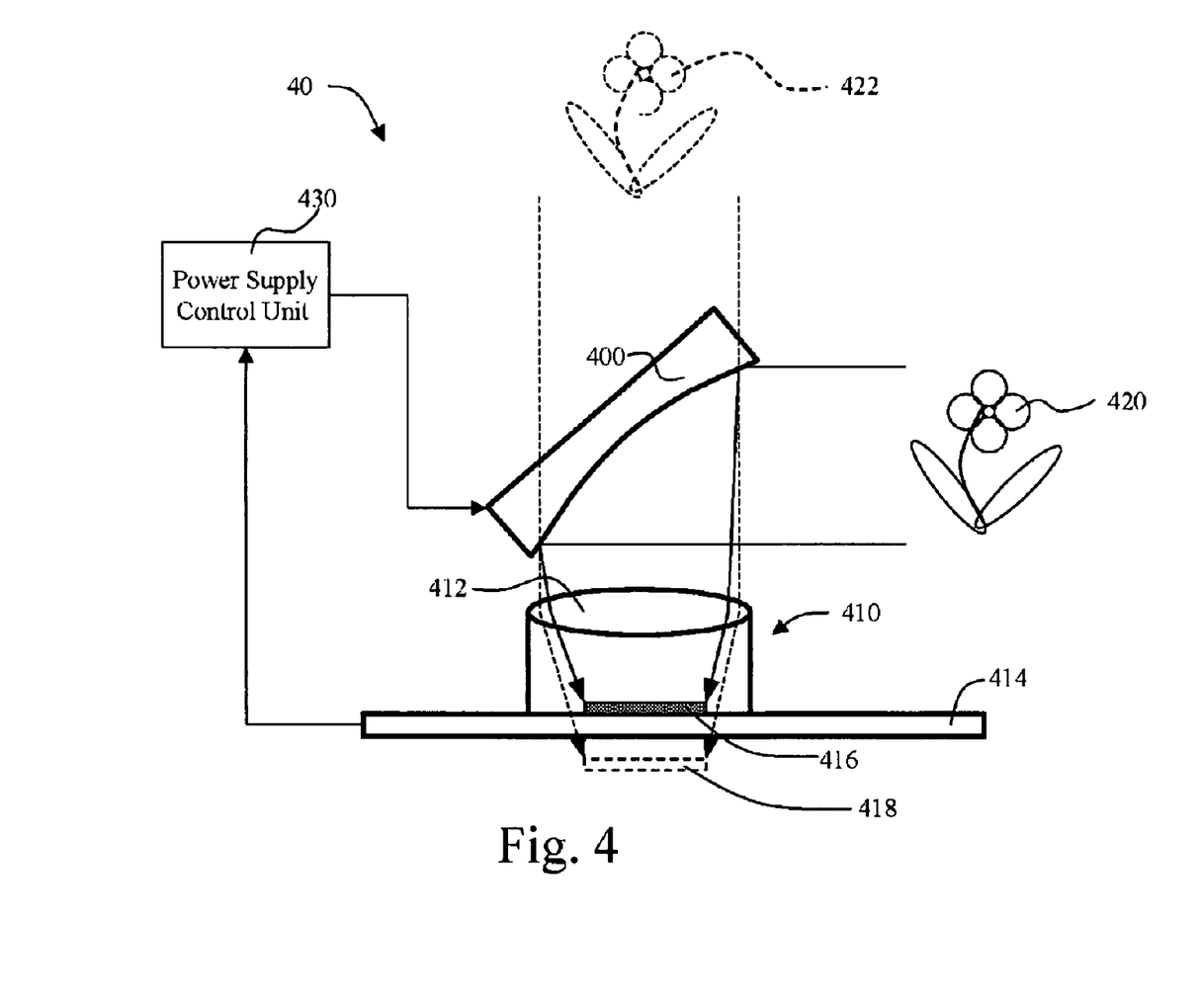
FIG. 4 is a diagram illustrating an image system utilizing the miniature deformable mirror according to one preferred embodiment of the present invention.

FIG. 4 illustrates how the miniature deformable mirror 200 according to one preferred embodiment of the present invention is used to provide sharp image outputs for an image system 40. The image system 40 comprises a camera module 410, a miniature deformable mirror 400, and a power supply control unit 430. The camera module 410 may comprise a lens set 412, a control circuitry 414, and an image-sensing element 416. The lens set 412 usually has a fixed focal length after manufacturing. The control circuitry 414 electronically connects to the image-sensing element 416. Typically, an object 422 is positioned very close to the traditional camera module 410, which cannot be focused properly on the image-sensing element 416, but is focused on a projection plane 418 instead. This results in blurred image outputs.

In order to have the projection of the object 422 shifted from the projection plane 418 to the image-sensing element 416, the deformable mirror 400 is disposed within the light path to adjust the focal length of the camera module 410. Since the deformable mirror 400 reflects light instead of transmitting light, an image position of the object 422 is firstly moved to a new object position 420, which maintains the same physical distance to the image-sensing element 416. Even though it has the same physical distance, the projection of the new object position 420 is adjustable by the deformable mirror 400 with adequate voltages applied by a power supply control unit 430. In this manner, an object's projection can fall right on the image-sensing element 416, and a sharp and focused image output is created no matter where the object is.

Figure 5:
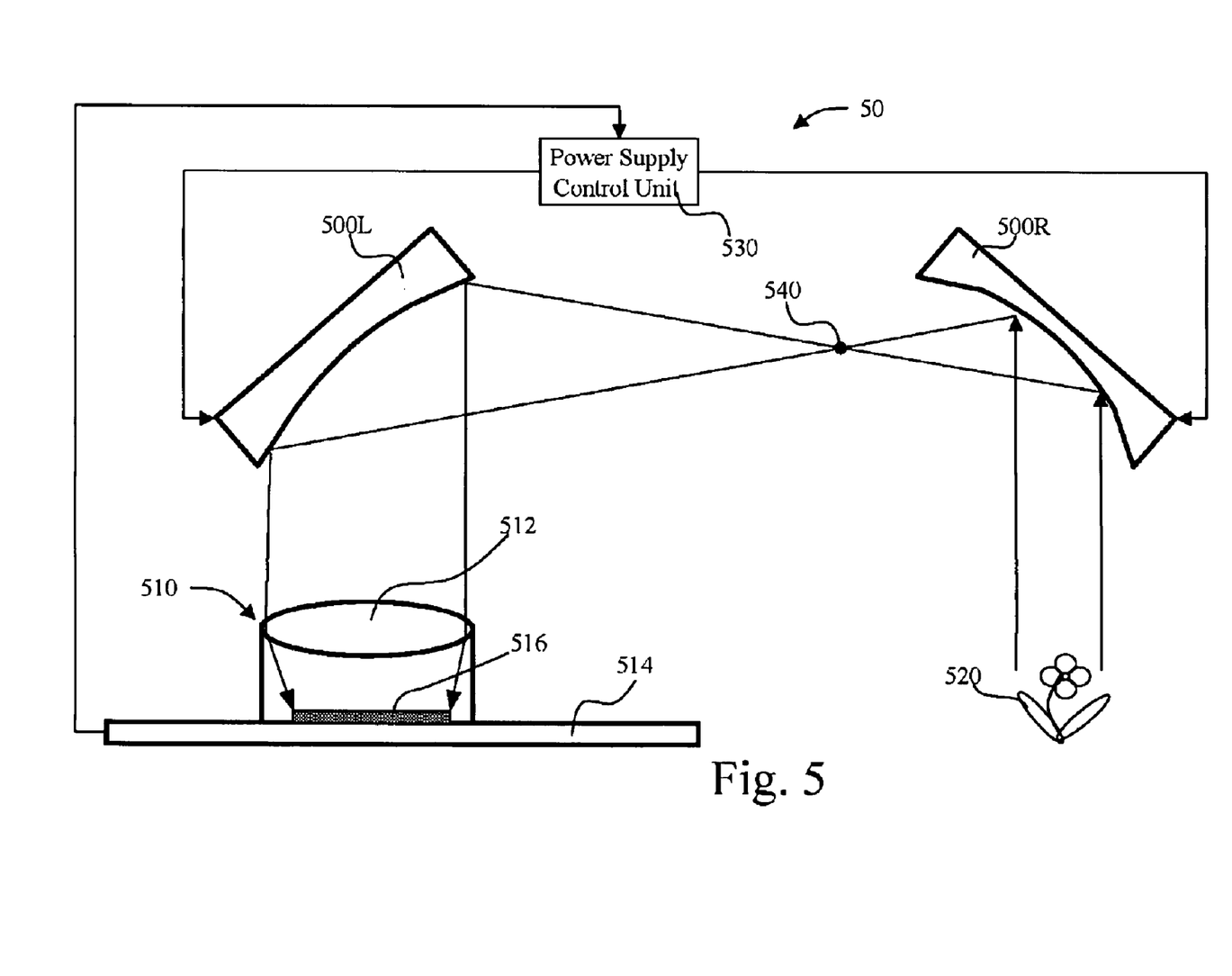
FIG. 5 is a diagram illustrating a zooming system utilizing the miniature deformable mirrors according to one preferred embodiment of the present invention.

FIG. 5 is an illustration of using the miniature deformable mirrors according to one preferred embodiment of the present invention in a zooming application, such as an imaging system to enlarge the captured image of an object. As shown in FIG. 5, it illustrates another image system 50 according to the present invention, in which a camera module 510 comprises a lens set 512, a control circuitry 514, and an image-sensing element 516. The control circuitry 514 electronically connects to the image-sensing element 516. Since the lens set 512 usually has a fixed focal length after manufacturing, an object with an unchanged distance to the lens set 512 can only have one unchanged image size on the image-sensing element 516. In order to have the function of zooming-in, at least a first deformable mirror 500R and a second deformable mirror 500L have to be disposed within the light path, and they have to be aligned so that an object 520 can project to the image-sensing element 516 by mirror reflections. Subsequently, a power supply 530, with control signals from the control circuitry 514, can provide adequate voltages to the first and second deformable mirrors 500R, 500L for properly deforming to reflect light. The focal lengths of the two deformable mirrors 500R, 500L can therefore be adjusted respectively, which focal points coincided with each other at a position 540. Accordingly, the projection enlargement, scaled from the object 520 to the image at the lens set 512, can be determined by the designated focal length ratio of the two deformable mirrors 500R, 500L.

Alternatively, the zooming-out function can easily be achieved by the same configuration but with another coincided focal position, producing a reversed designated focal length ratio of the two deformable mirrors 500R, 500L.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image system comprising:
    a camera module comprising a lens set, an image-sensing element obtaining a image from the lens set, and a control circuitry electronically connected to the image-sensing element;
    a miniature deformable mirror comprising:
        an upper portion comprising an organic thin film and a reflecting layer disposed on a lower surface or on an upper surface of the organic thin film;
        a lower portion comprising a conductive substrate; and
        a spacer disposed between the upper portion and the lower portion, wherein the spacer of the miniature deformable mirror comprises a spacer opening for defining a deflecting area and the spacer further comprises at least one air channel extending from the spacer opening, with the spacer having an outer periphery, with the spacer opening spaced from the outer periphery, with the at least one air channel extending from the spacer opening to the outer periphery; and
    a power supply control unit electronically connected to the control circuitry of the camera module and the miniature deformable mirror.

2. The image system of claim 1, wherein the organic thin film of the miniature deformable mirror is transparent.

3. The image system of claim 1, wherein the conductive substrate of the miniature deformable mirror is transparent.

4. The image system of claim 1, wherein the reflecting layer and The conductive substrate are a first electrode and a second electrode, respectively.

5. The image system of claim 1, wherein the upper portion of the miniature deformable mirror further comprises a frame having a mirror opening, with the frame disposed on the organic thin film and the reflecting layer to support the organic thin film and the reflecting layer to be disposed between the frame and the spacer.

6. The image system of claim 1, wherein the conductive substrate comprises a substrate and a conductive layer disposed on the substrate.

7. The image system of claim 6, wherein the organic thin film is transparent.

8. The image system of claim 6, wherein the conductive substrate is transparent.

* * * * *